Jan. 29, 1924.
N. B. HENRY
1,481,838
APPARATUS FOR EXPRESSING OIL FROM COTTON AND SIMILAR SEED MEATS
Filed Sept. 9, 1919
2 Sheets-Sheet 2
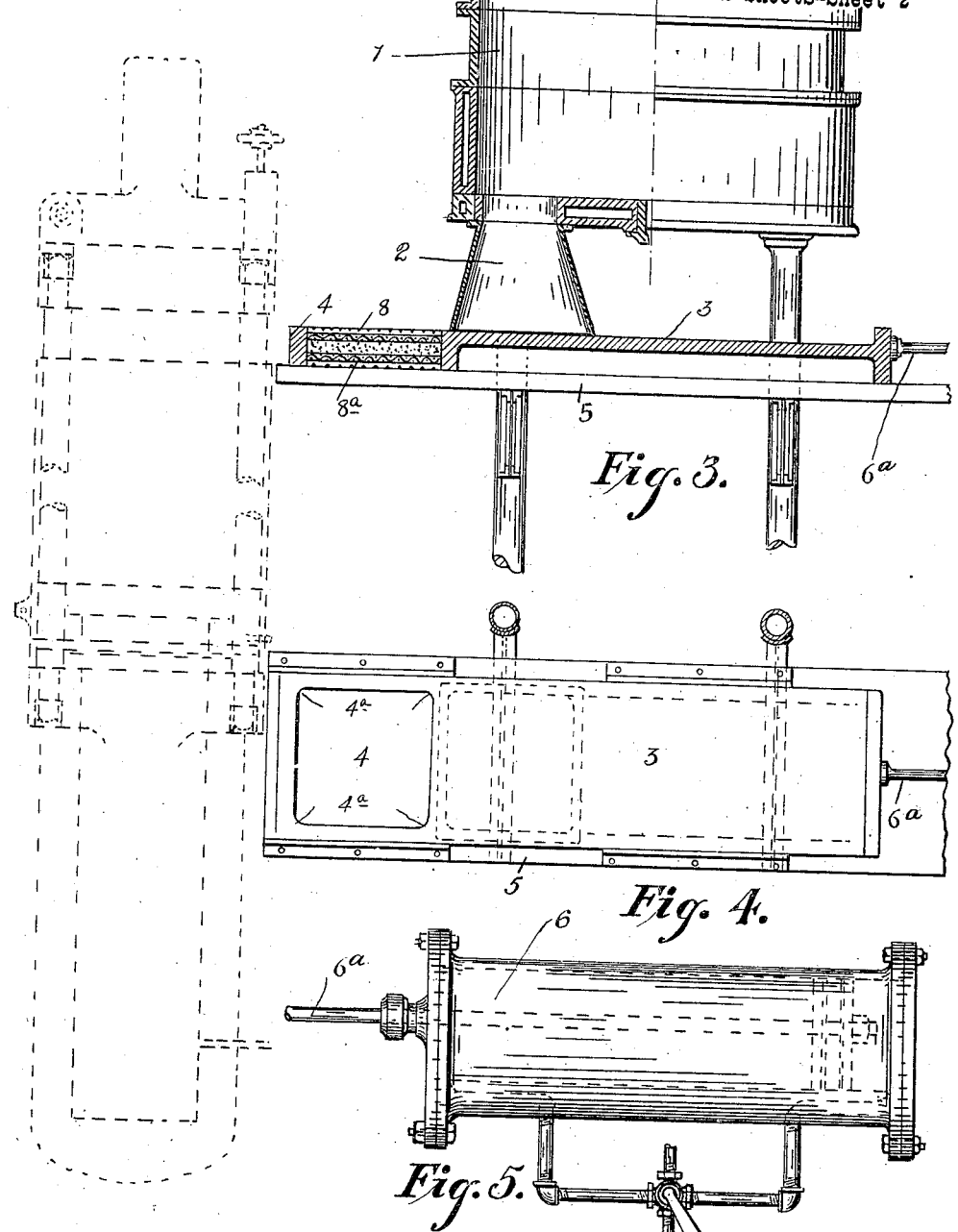
INVENTOR
Nelson B. Henry
BY John Davis
ATTORNEY Patented Jan. 29, 1924.

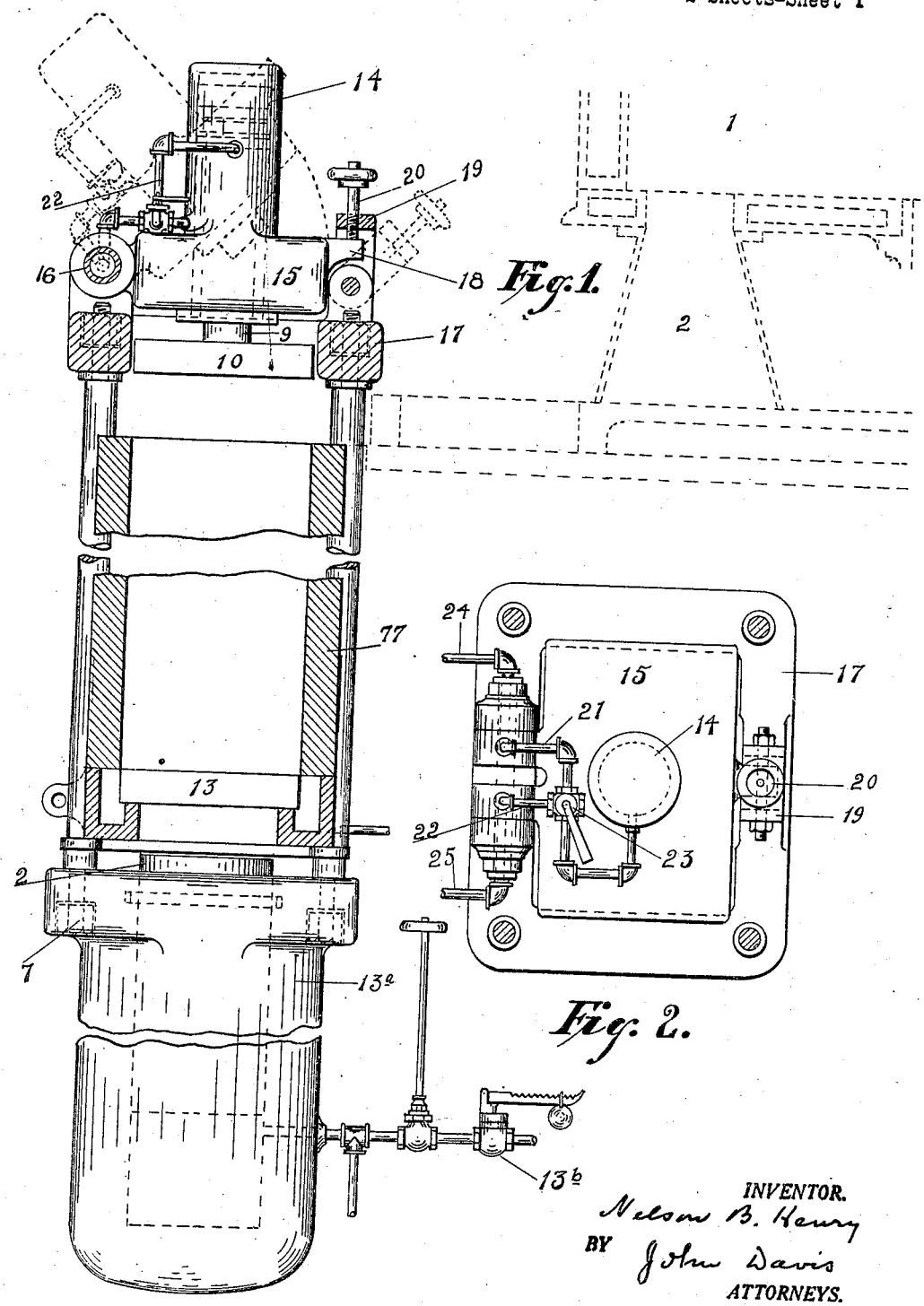

1,481,838

UNITED STATES PATENT OFFICE.

NELSON B. HENRY, OF ATLANTA, GEORGIA, ASSIGNOR TO THE MURRAY COMPANY, OF DALLAS, TEXAS, A CORPORATION OF TEXAS.

APPARATUS FOR EXPRESSING OIL FROM COTTON AND SIMILAR SEED MEATS.

Application filed September 9, 1919. Serial No. 322,654.

*To all whom it may concern:*

Be it known that I, NELSON B. HENRY, a citizen of the United States, residing at Atlanta, in the county of Fulton and State of Georgia, have invented certain new and useful Improvements in Apparatus for Expressing Oil from Cotton and Similar Seed Meats, of which the following is a specification.

My invention has relation to an apparatus for the expressing of oil from cotton and similar seed meats and in such connection it relates more particularly to the arrangement and construction of the apparatus whereby the cake is evenly and economically formed and accurately and directly fed from the cake forming means to and stacked in an expressing cage.

Heretofore in the generally used type of oil press, the formed cakes when removed from the cake forming means and wrapped in their cloths by hand, are removed by hand and stacked in a press by hand. The cakes are improperly shaped and their stacking in the press is awkward and inaccurate for the full expressing of the oil.

In this my present application for patent, I have shown and described and will hereafter claim, a cake forming means comprising a cake shaping die arranged to be reciprocated between three positions one below the discharge from the cooker, a second beyond the cooker and the third below a plunger and in registration with the cake receiving cage of a press, whereby upon the operation of the plunger the cakes are consecutively forced from the die into and downwardly in the cage until said cage is filled. The present application has therefore relation to the cake forming and stacking means, other portions of the machinery and apparatus required being illustrated in companion applications for patent.

The nature and scope of my invention will be more fully understood from the following description taken in connection with the accompanying drawings forming part hereof, in which—

Figure 1 is a side elevation of an oil press embodying the main features of my invention, the cooker and cake forming die being shown in dotted lines.

Figure 2 is a top or plan view of the press.

Figure 3 is a side elevational view partly sectioned of the cooker and cake forming means.

Figure 4 is a plan view of the reciprocating frame and cake-forming die, and

Figure 5 is a detail of the hydraulically operated piston for operating the frame and die.

Referring to the drawings, 1 is a cooker of any preferred type of construction and 2 is the discharge outlet therefrom. Arranged below the outlet 2 and in close proximity thereto is a sliding table 3, carrying at its left hand end, a cake-shaping die 4. The table 3, with its die 4 is carried upon a way or table 5, and is arranged to be moved thereon into either of the required positions by means of a power mechanism. I have shown in the drawings a cylinder and piston 6, operated by any suitable fluid, the stem or rod 6$^a$, of which is connected with the right hand end of table 3. The three positions required in the mechanism shown are, first, a position betwen the plunger 10 and the cooker outlet 2, in which the lower covering 8$^a$ of the cake is placed in position in the die, and supported by the way or table 5 (see Fig. 3); second, a position beneath the cooker outlet 2, in which the die is filled with cooked seed, the outlet being progressively opened as the table 3 is shifted to the right, the seed being retained in the die by the cover 8$^a$ supported by the table or way 5; third, a shift back to the first position, in which position the top covering 8 is applied to the cake, the cooker outlet being progressively closed, as the die is moved, by the table 3 (see Fig. 3); fourth, a position in which the die is brought beneath the plunger 10, the die passing beyond the table 5 and over the cage 77 with its contained following block or cakes, in readiness to be operated upon by the plunger 10. The die 4 preferably has its corners 4$^a$ rounded in order that the cooked meats may fill out the entire chamber of the die.

When the die with the covered cake is moved so that its chamber registers with the interior of the cage 77 in press 7, said interior of the cage being of an area and outline corresponding to the area and outline of the chamber of said die 4, the plunger 10, actuated by piston 9, moves downward to compact the cake and force it into the cage. The piston 9 is now withdrawn to lift the plunger 10 out of the die and said die is then brought back to a position to receive the bottom covering for a cake and the sequence of steps above described is repeated until the cage in press 7 is filled with cakes. In the sequence of steps the cooker discharge opening is at all times closed except when the die 4 is below the cooker opening the means shown being the table 3, also the bottom covering of the cake, placed in the die, is at all times supported, the means shown being either the table 5 or the contents of the cage, when the die is beneath the plunger 10.

The filled cage is removed from press 7 and placed in the oil expressing press, not shown.

The press 7 is provided at its base with a hydraulic piston 12 which when operated forces a block 13 upwards in the cage to dislodge the cakes after the oil has been extracted therefrom. This block 13 acts as a follow up block in the stacking of the cakes in the chamber of the cage as they are forced out of the forming die 4 by plunger 10 as follows: When the first cake is brought under plunger 10, the follow block 13 is flush or level with the top of the press cage and with the bottom of the cake forming die. As the plunger 10 is operated to force the cake out of die 4 into the cage, its movement is transmitted to follow block 13 causing the same to yield a corresponding distance. The hydraulic fluid displaced in press cylinder 13$^a$ during this yielding movement of block 13 and piston escapes through a relief valve 13$^b$. As successive cakes are stacked in the cage, the last cake above block 13 is on a level with the top of the cage and flush with the bottom of the cake forming die, and block 13 is successively forced down the required distance in the manner as above set forth. By suitable regulation of relief valve 13$^b$ the density of the cake packed in the cage can be accurately established. This accuracy is desirable for the reason that if the density of the packed cake in such cage is made uniform the succeeding expressing operation is facilitated and the highest percentage of oil extraction is secured. The follow up block 13 with its regulatable relief valve 13$^a$ therefore acts as a resistance means for compressing each cake in the cage thus permitting of the reception of a maximum number of cakes in said cage. To permit of the dislodgment of the cakes, the upper piston 11 and plunger 10 are so arranged as to be swung backward on the top of the press to clear the top of the cage. While many arrangements of the upper piston and plunger may be made to permit of the clearance or uncovering of the top of the press 7, the arrangement shown in the drawing is preferred. In this instance the cylinder 14 for the piston 11 is supported by a relatively heavy base 15 and this base is hinged at one side as at 16 to a top frame 17 for press 7. The other side of the base is provided with a lug 18 fitting under a hinged frame 19 carrying a locking bolt 20.

When bolt 20 is retracted from the lug 18, the frame 19 may be swung to clear the lug 18, and the cylinder 14 with its base 15 may be swung on its hinges 16 to clear the top of press 7. It is to be understood that the inlet and outlet pipes 21, 22 and valve 23, controlling said pipes, swing with the cylinder and base, the pipes 21, 22 having suitable swivel connection with the stationary fluid pipes 24—25 which are supported by and traverse that part of hinge connection 16 which is part of or supported by the top frame 17 for press 7.

Having thus described the nature and objects of my invention, what I claim as new and desire to secure by Letters Patent is—

1. In an apparatus of the character described, an open-ended die, formed in a die table; a second table on which the die table slides in a straight path; a cage, operatively arranged in the path of the die; a cake-forming plunger above the cage and over the path of the die, a yielding resistance plunger moving through the cage and beneath the cake-forming plunger to react against the cake forming plunger in compacting the cake.

2. In an apparatus of the character described, an open-ended die, formed in a die table; a second table on which the die table slides in a straight path; a cage, operatively arranged in the path of the die; a cake forming plunger above the cage and over the path of the die, a yielding resistance plunger, operating within the cage, and having a plunger cylinder; a relief valve connected to that plunger cylinder; the resistance plunger reacting against the cake forming plunger in compacting the cake.

In testimony whereof I have signed my name to this specification.

NELSON B. HENRY.